(12) United States Patent
Hata et al.

(10) Patent No.: US 8,736,584 B2
(45) Date of Patent: May 27, 2014

(54) COORDINATE SENSOR AND DISPLAY DEVICE

(75) Inventors: Masayuki Hata, Osaka (JP); Toshiaki Nakagawa, Osaka (JP); Toshiyuki Yoshimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 150 days.

(21) Appl. No.: 13/515,296

(22) PCT Filed: Oct. 26, 2010

(86) PCT No.: PCT/JP2010/068993
§ 371 (c)(1),
(2), (4) Date: Jun. 12, 2012

(87) PCT Pub. No.: WO2011/074331
PCT Pub. Date: Jun. 23, 2011

(65) Prior Publication Data
US 2012/0249484 A1    Oct. 4, 2012

(30) Foreign Application Priority Data

Dec. 16, 2009    (JP) .................................. 2009-285684

(51) Int. Cl.
*G06F 3/042*    (2006.01)
(52) U.S. Cl.
USPC ......................................................... 345/175

(58) Field of Classification Search
USPC ........................................................... 345/175
See application file for complete search history.

(56) References Cited

U.S. PATENT DOCUMENTS

2011/0115747 A1* 5/2011 Powell et al. ................. 345/175
2011/0157097 A1  6/2011 Hamada et al.

FOREIGN PATENT DOCUMENTS

| GB | 2 180 061 A | 3/1987 | |
|----|----|----|----|
| JP | 61-240314 A | 10/1986 | |
| JP | 62-026527 A | 2/1987 | |
| JP | 2004303172 A * | 10/2004 | ............. G06F 3/033 |
| JP | 3797803 B2 | 7/2006 | |

OTHER PUBLICATIONS

Official Communication issued in International Patent Application No. PCT/JP2010/068993, mailed on Feb. 1, 2011.

* cited by examiner

*Primary Examiner* — Kevin M Nguyen
(74) *Attorney, Agent, or Firm* — Keating & Bennett, LLP

(57) ABSTRACT

A coordinate sensor of the present invention includes light emitting diodes (10) and line sensors (13) each including light receiving elements (13*s*), and further includes, between the light emitting diodes (10) and the light receiving elements (13*s*), wavelength selective reflection mirrors (11) for allowing light emitted from the light emitting diodes (10) to be selectively incident to the light receiving elements (13*s*).

9 Claims, 8 Drawing Sheets

F I G. 5
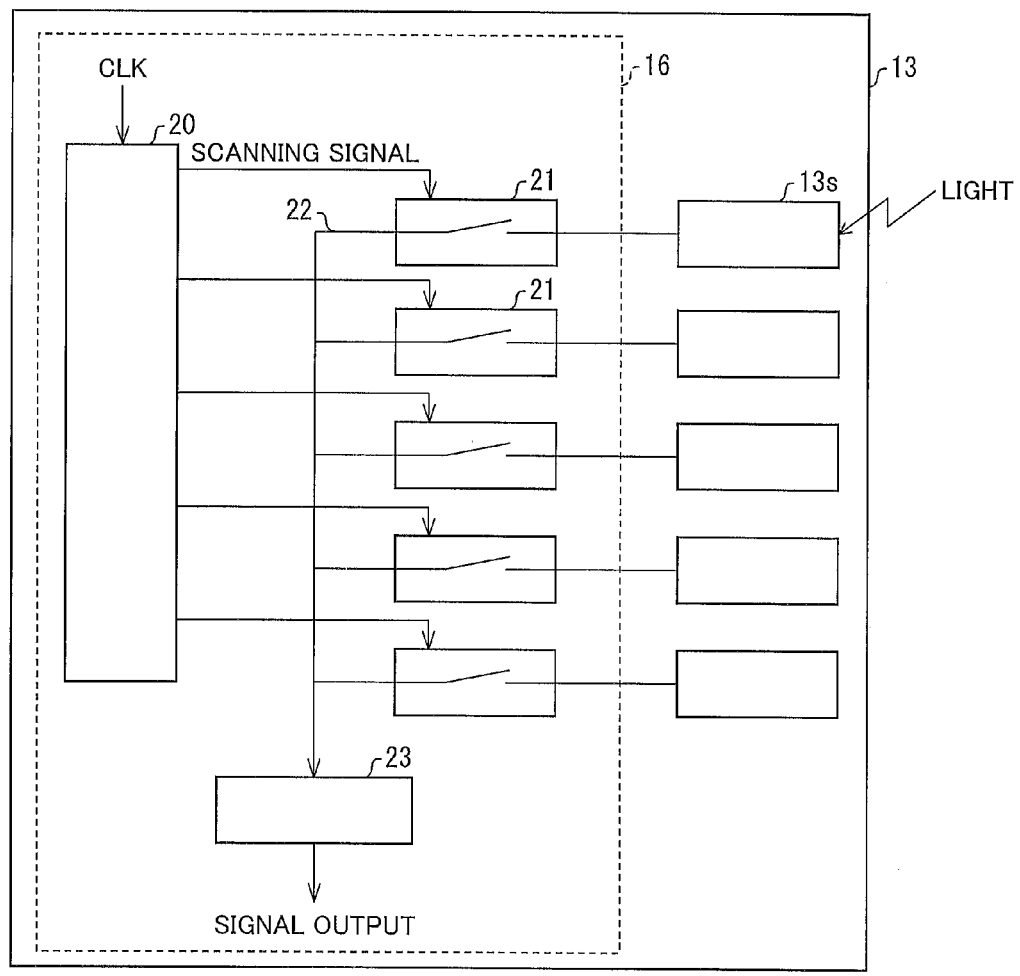

COORDINATE SENSOR AND DISPLAY DEVICE

TECHNICAL FIELD

The present invention relates to a coordinate sensor for detecting indicated coordinates of a detection target such as a finger and a pen, and to a display device including the coordinate sensor.

BACKGROUND ART

Among display devices such as liquid crystal devices, there have been developed display devices with a touchscreen panel which has a touchscreen panel (coordinate sensor) function designed such that when a finger or an input pen touches the surface of the panel, the touched position can be detected.

Conventionally, such display devices with a touchscreen panel have been mainly display devices using a so-called a resistive touchscreen panel or a capacitive touchscreen panel.

However, such display devices require, for example, a special panel for detecting a position, resulting in a problem that the device as a whole becomes thicker. Furthermore, providing such a touchscreen panel on a screen (display region) of the display device raises a problem that visibility drops.

For this reason, recently, instead of display devices including a resistive touchscreen panel or capacitive touchscreen panel, there has been developed a touchscreen panel-integrated display device in which so-called two-dimensional sensor array is built, which includes light receiving elements (optical sensor elements) such as photodiodes and phototransistors positioned in a matrix manner.

However, since such a display device includes light receiving elements in a screen, there arises a problem that an open area ratio drops. In addition, there arises a problem that an optical signal reading circuit gets complicated.

Furthermore, in a case where bus lines (scanning signal lines and display data signal lines) of display elements (driving elements) such as TFTs (Thin Film Transistors) double as bus lines (scanning signal lines and data read lines) of light receiving elements so that display and sensing are performed in a time-dividing manner in order to avoid the drop in the open area ratio, operation speed is limited.

In order to deal with these problems, there has been developed a touchscreen panel-integrated display device employing optical scanning. Such a display device is free from problems such as the drop in the open area ratio and limitation of operation speed.

The touchscreen panel-integrated display device employing optical scanning is a display device designed such that light scans a panel surface and detects blocking of the light by a finger etc. to detect the position of the finger.

For example, Patent Literature 1 describes a touchscreen panel-integrated display device employing optical scanning.

FIG. 11 is a drawing schematically showing a whole configuration of the display device.

As shown in FIG. 11, outside both ends of a short side of a rectangular display screen 100 (right side in the drawing) to be touched by an indicating object (recognized object) S which is a finger, a pen etc., there are provided light transmitting and receiving units 101a and 101b having therein optical systems including light emitting elements 111a and 111b, light receiving elements 113a and 113b, and polygon mirrors 116a and 116b etc., respectively. Outside three sides other than the right side of the display screen 100, there is provided a recursive reflective sheet 102.

The following explains scanning by light projected from the light transmitting and receiving unit 101b. Light projected from the light transmitting and receiving unit 101b scans counterclockwise in FIG. 11 from a scan start position at which the light is directly incident to the light receiving element 113b to a position at which the light is blocked by a light blocking member 170 for preventing the light from the light transmitting and receiving unit 101b from being incident to the light transmitting and receiving unit 101a, and to a position (Ps) at which the light is reflected by an end of the recursive reflective sheet 102. Thereafter, the projected light is reflected by the recursive reflective sheet 102 until a position (P1) at which the light reaches one end of the indicating object S. Subsequently, until a position (P2) at which the projected light reaches the other end of the indicating object S, the light is blocked by the indicating object S, and from the position (P2) to a scan position (Pe), the projected light is reflected by the recursive reflective sheet 102.

The light receiving element 113b detects reflective light from the recursive reflective sheet 102, and when the level of the received reflective light is smaller than a predetermined threshold at a certain area, the light receiving element 113b identifies the area as a blocked area where light is blocked by a finger or a pen.

In the display device described in Patent Literature 1, when the light receiving element 113b judges that there is no indicating object S, light emission by the light emitting elements 111a and 111b is stopped. While the light emission is stopped, a predetermined margin voltage is added to values detected by the light receiving elements 113a and 113b to obtain the threshold.

The margin voltage is determined based on fluctuation in the amount of received light accompanying noises in a light receiving system, digitalization error in A/D conversion, accumulated data of received light in a time line etc.

CITATION LIST

Patent Literatures

Patent Literature 1

Japanese Patent No. 3797803 (registered on Apr. 28, 2006).

SUMMARY OF INVENTION

Technical Problem

However, the display device disclosed in Patent Literature 1 suffers a problem that when there is the indicating object S, it is difficult to set the threshold exactly.

That is, in the display device, when it is judged that there is no indicating object S, scan light is made off and the light receiving elements 113a and 113b detect the amount of received light. Since the threshold is set based on the result of the detection, the threshold is set in such a manner that the influence of ambient light is eliminated. Consequently, according to Patent Literature 1, it is possible to improve accuracy in detecting the indicating object S.

However, in the display device disclosed in Patent Literature 1, the threshold is set based on the amount of light received when the scan light is made off, and accordingly when there is the indicating object S, it is difficult to exactly set the threshold in such a manner that the influence of ambient light is eliminated. Therefore, when the indicating object S exists, it is difficult to improve accuracy in detecting the indicating object S.

The present invention was made in view of the foregoing problem. An object of the present invention is to provide a coordinate sensor capable of easily detecting the exact position of a recognized object regardless of a change in ambient light, and a display device including the coordinate sensor.

Another object of the present invention is to provide a coordinate sensor capable of easily detecting the exact position of a recognized object even when ambient light is intense, and a display device including the coordinate sensor.

Solution to Problem

In order to solve the foregoing problem, a coordinate sensor of the present invention is a coordinate sensor, including: at least one light emitting element; and at least two line sensors each including a plurality of light receiving elements, said at least two line sensors being positioned along an x-axis direction and a y-axis direction, respectively, light emitted from said at least one light emitting element passing through an image display region of an image display body and being received by at least one of the plurality of light receiving elements, so that indicated coordinates of a detection target are detected based on a change in an amount of light received by said at least one of the plurality of light receiving elements, the coordinate sensor further including, between said at least one light emitting element and the plurality of light receiving elements, at least one wavelength selecting section for allowing the light emitted from said at least one light emitting element to be selectively incident to said at least one of the plurality of light receiving elements, said at least one wavelength selecting section having at least one function of selectively reflecting, selectively transmitting, and selectively reflecting and transmitting the light emitted from said at least one light emitting element.

With the arrangement, between said at least one light emitting element and the plurality of light receiving elements, there is provided at least one wavelength selecting section for allowing the light emitted from said at least one light emitting element to be selectively incident to said at least one of the plurality of light receiving elements. Consequently, ambient light is less likely to be incident to the light receiving element.

Therefore, it is easy to detect the exact position of a recognized object regardless of a change in ambient light.

In particular, for example, even when the amount of ambient light is larger than the amount of light from the light emitting element, detection of coordinates is less likely to be influenced by the ambient light.

Consequently, with the arrangement, even when the ambient light is intense, the coordinate sensor can easily detect the exact position of a recognized object.

It should be noted that the wavelength selecting section which selectively reflects and transmits light includes not only a single member which selectively reflects and transmits light but also a combination of a member which selectively reflects light and a member which selectively transmits light (e.g. a combination of a band pass mirror and a band pass filter).

Advantageous Effects of Invention

The coordinate sensor of the present invention is a coordinate sensor, including: at least one light emitting element; and at least two line sensors each including a plurality of light receiving elements, said at least two line sensors being positioned along an x-axis direction and a y-axis direction, respectively, light emitted from said at least one light emitting element passing through an image display region of an image display body and being received by at least one of the plurality of light receiving elements, so that indicated coordinates of a detection target are detected based on a change in an amount of light received by said at least one of the plurality of light receiving elements, the coordinate sensor further including, between said at least one light emitting element and the plurality of light receiving elements, at least one wavelength selecting section for allowing the light emitted from said at least one light emitting element to be selectively incident to said at least one of the plurality of light receiving elements, said at least one wavelength selecting section having at least one function of selectively reflecting, selectively transmitting, and selectively reflecting and transmitting the light emitted from said at least one light emitting element.

Consequently, the coordinate sensor of the present invention can easily detect the exact position of a recognized object regardless of a change in ambient light.

BRIEF DESCRIPTION OF DRAWINGS

FIG. 1 is a view schematically showing a configuration of a liquid crystal display device in accordance with an embodiment of the present invention.

FIG. 2 is a cross sectional view schematically showing a configuration of a liquid crystal display device in accordance with an embodiment of the present invention.

FIG. 3 is a cross sectional view schematically showing configurations of members around a wavelength selective reflection mirror in accordance with an embodiment of the present invention. (a) shows configurations of members around a wavelength selective reflection mirror in accordance with an embodiment of the present invention. (b)-(d) of FIG. 3 shows configurations of a main part in (a) of FIG. 3.

FIG. 4 is a waveform chart for explaining an effect yielded by a wavelength selective reflection mirror in accordance with an embodiment of the present invention. (a) of FIG. 4 shows wavelength characteristics of signal light and ambient light, respectively. (b) of FIG. 4 shows a wavelength band at which reflectance of the wavelength selective reflection mirror is high. (b') of FIG. 4 shows a wavelength band at which transmittance of a transmission filter is high. (c) of FIG. 4 shows an effect of the wavelength selective reflection mirror or the transmission filter removing the ambient light to extract only the signal light.

FIG. 5

FIG. 5 is a block diagram schematically showing a configuration of a line sensor.

FIG. 6 is a block diagram showing a system configuration of a liquid crystal display device in accordance with an embodiment of the present invention.

FIG. 7 is a plane view schematically showing a principle for detecting coordinates in a liquid crystal display device in accordance with an embodiment of the present invention.

FIG. 8 is a view for explaining how to calculate a position touched by a detection target such as a finger by triangulation.

FIG. 9 is a graph showing a relation between ambient illuminance and a ratio of a length of a light blocking film serving as a canopy to a height of a wavelength selective reflection mirror in a liquid crystal display device in accordance with an embodiment of the present invention.

FIG. 10 is a graph showing a relation between ambient illuminance and the number of slits of light blocking slits in a liquid crystal display device in accordance with an embodiment of the present invention.

FIG. 11 is a drawing schematically showing a whole configuration of a display device described in Patent Literature 1.

DESCRIPTION OF EMBODIMENTS

The following explains an embodiment of the present invention in detail.

Embodiment

With reference to FIGS. 1 to 10, the following explains an embodiment of the present invention.

In the present embodiment, an explanation is made as to a case where a coordinate sensor is applied to a liquid crystal display device serving as a display device.

(Schematic Configuration of Liquid Crystal Display Device)

Figure 1:
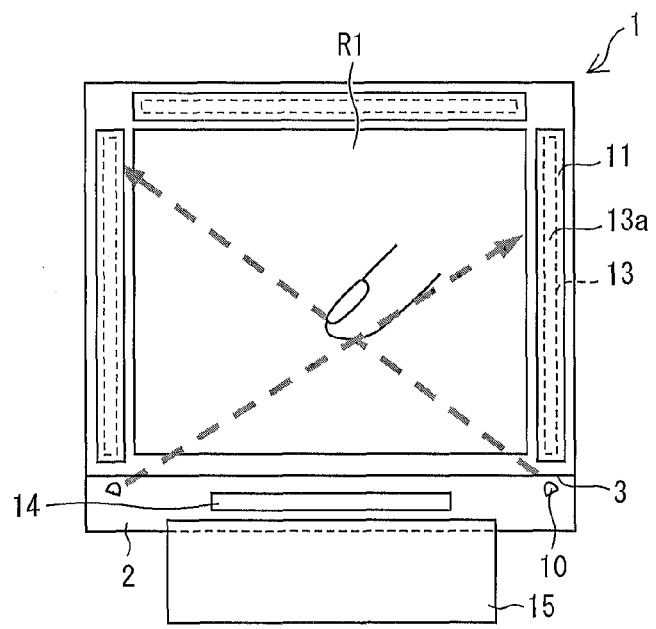
FIG. 1

FIG. 1 is a view schematically showing a configuration of a liquid crystal display device 1.

As shown in FIG. 1, the liquid crystal display device 1 includes an active matrix substrate 2 and a counter substrate 3 which are positioned to face each other and a liquid crystal layer (not shown) sealed by a sealing material between the substrates 2 and 3.

On a frame region of the active matrix substrate 2, a chip 14 is provided by a COG (Chip On Glass) technique, and an A/D conversion circuit, a gate/source drive circuit etc. for example are mounted on the chip 14. Furthermore, the chip 14 is connected with an external circuit via an anisotropic conductive film and FPC (Flexible Printed Circuits, flexible substrate) 15.

In the present embodiment, the chip 14 is provided at the frame region of the active matrix substrate 2 by the COG technique. However, the present invention is not limited to this, and the chip 14 may be directly provided on the FPC 15 by a COF (Chip On FPC) technique for example.

Outside upper, left, and right sides of a display region (coordinate input region of coordinate sensor) R1 of the liquid crystal display device 1, there are provided line sensors 13 serving as a coordinate sensor, respectively, and on light receiving surfaces 13a of the line sensors 13, there are provided wavelength selective reflection mirrors 11 serving as a wavelength selecting section, respectively. The upper side indicates a side opposite to a side where the FPC 15 is provided in the liquid crystal display device 1.

As detailed later, each of the line sensors 13 includes a light receiving element 13s (see FIG. 5) and a line sensor detection circuit 16 (see FIG. 5).

In the present embodiment, in order to reduce the width of the frame of the liquid crystal display device 1, the wavelength selective reflection mirror 11 is a prism with an inclined plane molded or polished to serve as a 45° mirror to light from a light emitting diode 10 (explained later) serving as a light emitting element, so that the wavelength selective reflection mirror 11 overlaps the line sensor 13 on a plane view. However, the present invention is not limited to this configuration.

On both ends of the outside of the lower side of the display region R1 of the liquid crystal display device 1, there are provided two light emitting diodes 10 as light sources (light emitting element) for a coordinate sensor.

In the present embodiment, there are provided two light emitting diodes 10 as light sources for a coordinate sensor. However, the position of the light emitting diode 10 and the number of the light emitting diode 10 are not particularly limited as long as the light emitting diode 10 can emit light in such a manner as to cover the whole surface of the coordinate input region R1 of the coordinate sensor.

It is preferable that the light emitting diode 10 emits invisible light such as infrared or ultraviolet light in such a manner as to cover the whole surface of the coordinate input region R1 of the coordinate sensor. That is, it is preferable that the light emitting element emits light whose wavelength band is out of a visible region. This allows emitting non-visible light and detecting coordinates (indicated coordinates) of a recognized object as a detection target, without influencing a display state of the liquid crystal display device 1.

On the other hand, it is preferable that the wavelength selective reflection mirror 11 reflects only light from the light emitting diode 10 so as to guide the light to the light receiving surface 13a of the line sensor 13. This configuration allows preventing light other than the light from the light emitting diode 10 (e.g. ambient light) from entering the light receiving surface 13a of the light receiving element 13s.

Light from a fluorescent lamp or dim ambient light in the open air hardly includes infrared or ultraviolet light. Accordingly, in a case where the light emitting diode 10 is designed to emit infrared or ultraviolet light, it is possible to more surely guide only light from the light emitting diode 10 to the light receiving surface 13a of the light receiving element 13s.

In the present embodiment, there is provided the wavelength selective reflection mirror 11 which reflects only the light from the light emitting diode 10. However, the present invention is not limited to this. For example, a transmission filter may be provided on a light receiving mirror without a wavelength selecting reflective function. This transmission filter transmits only light from the light emitting diode 10, and the light is reflected by the light receiving mirror and enters the light receiving surface 13a of the line sensor 13. This configuration allows preventing light other than light from the light emitting diode 10 (e.g. ambient light) from entering the light receiving surface 13a of the line sensor 13.

In the present embodiment, outside the upper, left, and right sides of the display region (coordinate input region of coordinate sensor) R1 of the liquid crystal display device 1, there are provided the line sensors 13, respectively, and on the light receiving surfaces 13a of the line sensors 13, there are provided the wavelength selective reflection mirrors 11, respectively. However, the positions of the wavelength selective reflection mirror 11 and the line sensor 13 and the number of the wavelength selective reflection mirror 11 and the line sensor 13 are not particularly limited, and may be determined appropriately in consideration of emission characteristics, position, the number etc. of the light emitting diode 10.

It is preferable to design the coordinate input region R1 such that the line sensors 13 are provided along at least two sides in order to detect (x, y) coordinates (input coordinates) of a position touched by a recognized object.

(Cross Sectional Configuration of Liquid Crystal Display Device)

Figure 2:
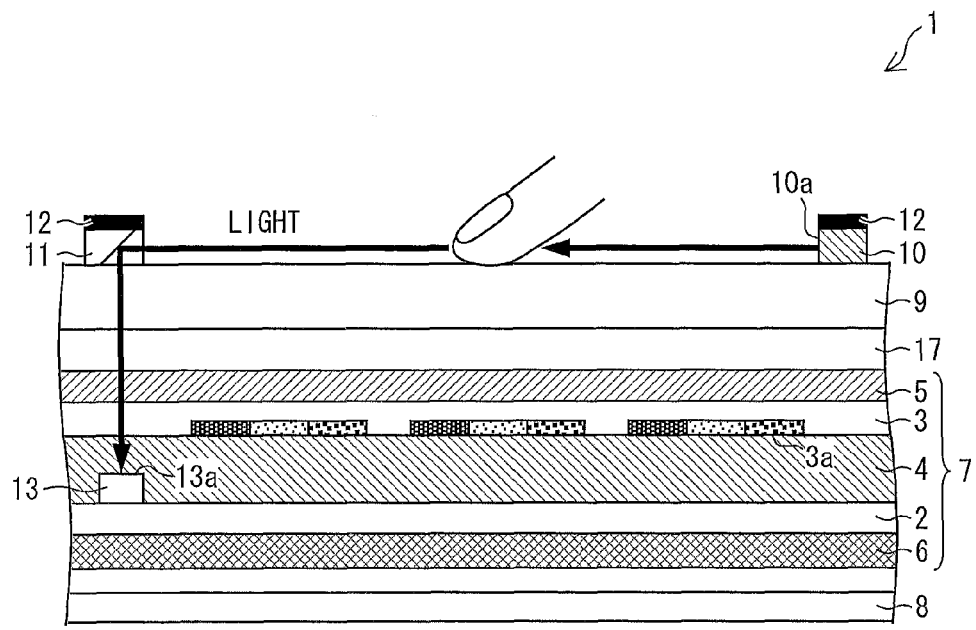
FIG. 2

Next, with reference to FIG. 2, an explanation is made as to a cross sectional configuration of the liquid crystal display device 1. FIG. 2 is a cross sectional view schematically showing a configuration of the liquid crystal display device 1.

As shown in FIG. 2, in the liquid crystal display device 1, one surface of a liquid crystal panel 7 constituting a main portion of an image display body is provided with a backlight 8, and the other surface is provided with a protecting plate 9. In the present embodiment, the surface of the protecting plate 9 serves as an image display surface.

The liquid crystal panel 7 is designed such that the active matrix substrate 2 and the counter substrate 3 are positioned to face each other and a liquid crystal layer 4 is sealed by a sealing material between the substrates 2 and 3.

On one surface of the active matrix substrate 2 which surface faces the counter electrode 3, there are provided pixel TFTs (not shown) for driving pixel electrodes in accordance with video signal data and the line sensors 13. As for the line sensors 13, a detailed explanation will be made later with reference to FIG. 5 which is a block diagram schematically showing a configuration of a line sensor in accordance with the present embodiment. The other surface of the active matrix substrate 2 is provided with a lower side polarization plate 6.

In the present embodiment, the line sensors 13 are provided in the same step as the pixel TFTs are formed on the active matrix substrate 2. Consequently, the line sensors 13 are provided on a surface of the matrix substrate 2 on which surface pixel TFTs are formed (active element formation surface). However, the line sensors 13 are not necessarily provided on the active matrix substrate 2.

On one surface of the counter substrate 3 which surface faces the active matrix substrate 2, there are laminated a color filter layer 3a, a counter electrode (not shown), and an orientation film (not shown). On the other surface of the counter electrode 3, there are laminated an upper side polarization plate 5 and the protecting plate 9 in this order.

The protecting plate 9 may be made of a material which can protect the liquid crystal panel 7 without decreasing visibility of the display region R1 of the liquid crystal display device 1, such as an acrylic transparent material. However, the protecting plate 9 is not limited to this.

At an end portion of the protecting plate 9, there is provided the light emitting diode 10, which emits light along the surface of the protecting plate 9 in such a manner as to cover the whole surface of the coordinate input region R1. In order to guide light from the light emitting diode 10 to the light receiving surface 13a of the line sensor 13 provided on the surface of the active matrix substrate 2 where pixel TFTs are provided, there is provided the wavelength selective reflection mirror 11 serving as a light path changing section.

The wavelength selective reflection mirror 11 is a mirror for reflecting only light from the light emitting diode 10 so that the light is guided to the light receiving surface 13a of a corresponding line sensor 13 which is positioned to face the wavelength selective reflection mirror 11. Here, "positioned to face" indicates that the mirror is positioned in such a manner that the light from the light emitting diode 10 is reflected by the wavelength selective reflection mirror 11 and enters the light receiving surface 13a of the line sensor 13.

Furthermore, an air layer 17 is provided between the protecting plate 9 and the upper side polarization plate 5.

As detailed later, at the portion where the air layer 17 exists, there is provided a light blocking film (not shown) in order to more surely prevent ambient light etc. from entering the line sensor 13.

Alternatively, the air layer 17 may be filled with an adhesive etc. for example so that the protecting plate 9 is attached to the liquid crystal panel 7. Also in this case, by inserting a light blocking film between the protecting plate 9 and the upper side polarization plate 5, it is possible to prevent ambient light etc. from entering the line sensor 13.

Furthermore, light blocking films 12 are provided on the light emitting diode 10 and the wavelength selective reflection mirror 11, respectively.

By providing the light blocking film 12 on the light emitting diode 10, it is possible to subdue the amount of light which is emitted from the light emitting diode 10 and directly enters the viewer's side of the liquid crystal display device 1.

Furthermore, by providing the light blocking film 12 on the wavelength selective reflection mirror 11, it is possible to subdue the amount of light which is other than the light from the light emitting diode 10 (e.g. ambient light) and which enters the light receiving surface 13a of the line sensor 13.

At the back side of the liquid crystal panel 7, there is provided the backlight 8 for emitting light to the liquid crystal panel 7. The backlight 8 includes a plurality of white LEDs as light sources.

(Configurations of Members Around Wavelength Selective Reflection Mirror 11)

Figure 3:
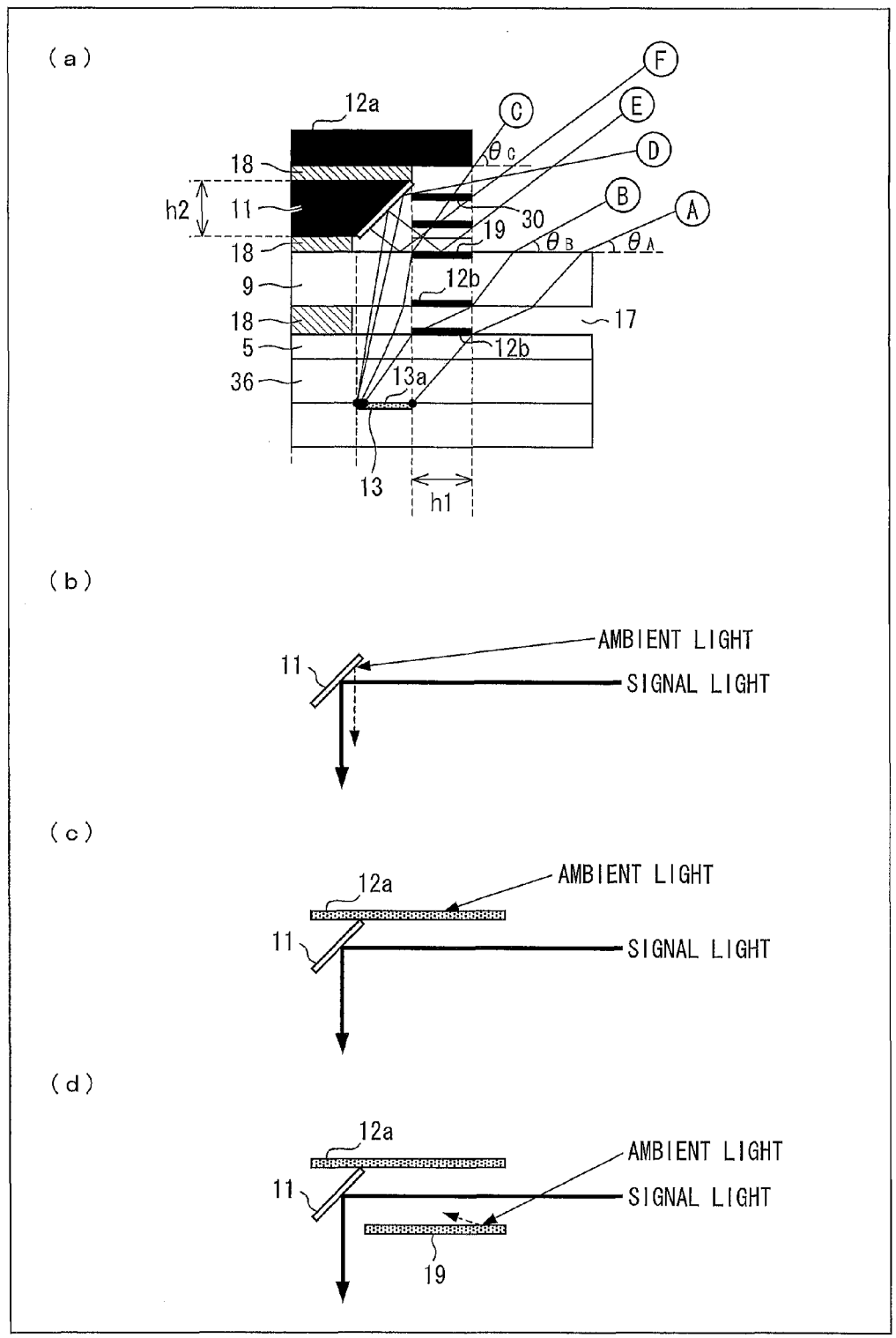
FIG. 3

With reference to FIG. 3, the following explains configurations of members around the wavelength selective reflection mirror 11 in more detail.

(a) of FIG. 3 is a cross sectional view schematically showing members around the wavelength selective reflection mirror 11. (b)-(d) of FIG. 3 are views schematically showing a main part in (a) of FIG. 3.

As shown in (a) of FIG. 3, a light blocking film 12a is provided as a canopy on the wavelength selective reflection mirror 11.

The light blocking film 12a serving as a canopy causes light other than the light from the light emitting diode 10 (e.g. ambient light) to be less likely to directly strike the wavelength selective reflection mirror 11, so that such light is less likely to enter the light receiving surface 13a of the line sensor 13.

Furthermore, since there is provided the wavelength selective reflection mirror 11, among light entering the wavelength selective reflection mirror 11, only light from the light emitting diode 10 is selectively reflected and enters the light receiving surface 13a of the line sensor 13 as shown in (b) of FIG. 3.

Consequently, it is possible to prevent light other than the light from the light emitting diode 10 (e.g. ambient light) from entering the line sensor 13.

The light blocking film 12a is most preferably made of a material which is black in color, completely blocks light, and has concavities and convexities that absorb light on its surface. The light blocking film 12a may be a tape or black coating (printing) in shape, but not limited to them.

The length h1 of the light blocking film 12a extended as a canopy changes depending on conditions under which a user uses the display device.

Figure 9:
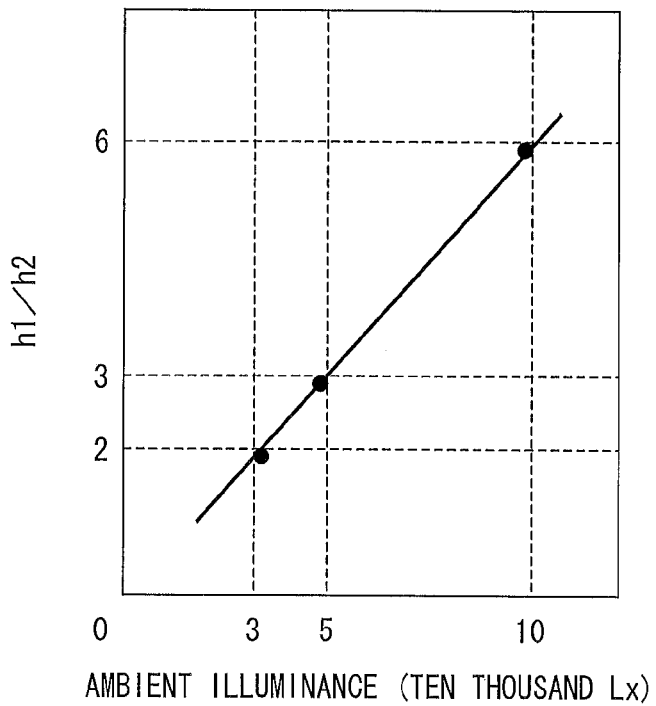
FIG. 9

FIG. 9 is a graph showing a relation between ambient illuminance and h1/h2 which is a ratio of the length h1 of the light blocking film 12a extended as a canopy required for blocking light to the height h2 of the wavelength selective reflection mirror 11.

As shown in FIG. 9, the ambient illuminance is in linear relation to h1/h2. For example, when the ambient illuminance is 30,000 1x to 100,000 1x, the length h1 of the light blocking film 12a required for blocking light is preferably not less than two times and not more than six times larger than the height h2 of the wavelength selective reflection mirror 11.

This configuration allows sufficiently reducing the amount of light which is other than the light from the light emitting diode 10 (e.g. ambient light) and which directly enters the wavelength selective reflection mirror 11.

For example, in a case where the thickness of the counter substrate 3 made of a glass substrate etc. is set to 0.2 mm, the thickness of the upper side polarization plate 5 is set to 0.3 mm, the thickness of the air layer 17 is set to 0.5 mm, the thickness of the protecting plate 9 is set to 0.7 mm, the thickness (height) h2 of the wavelength selective reflection mirror 11 is set to 0.5 mm, the length h1 of the light blocking film 12a is set to 1.5 mm, and the thickness of the sealing material 18 is set to 0.1 mm, it is possible to sufficiently reduce the amount of light which is other than the light from the light emitting diode 10 (e.g. ambient light) and which directly enters the wavelength selective reflection mirror 11.

Here, the protecting plate 9 and the wavelength selective reflection mirror 11 are attached to each other via the sealing material 18, and the wavelength selective reflection mirror 11 and the light blocking film 12a are attached to each other via the sealing material 18. Similarly, the protecting plate 9 and the end portion of the polarization plate 5 are attached to each other via the sealing material 18. Since the sealing material 18 shown in FIG. 3 is a double-faced adhesive tape etc. for fixation, the sealing material 18 is sufficiently thin compared with the height h2 of the wavelength selective reflection mirror 11.

Furthermore, there is the air layer 17 between the protecting plate 9 and the upper side polarization plate 5. Furthermore, on a surface of the protecting plate 9 which surface faces the air layer 17 and on a surface of the polarization plate 5 which surface faces the air layer 17, there are provided light blocking films 12b serving as light blocking members, respectively. This configuration allows blocking light other than the light from the light emitting diode 10 (e.g. ambient light), thereby preventing ambient light etc. from entering the light receiving surface 13a of the line sensor 13.

The light blocking film 12b is most preferably made of a material which is black in color, completely blocks light, and has concavities and convexities that absorb light on its surface. The light blocking film 12b may be a tape or black coating (printing) in shape, but not limited to them.

It is preferable that the light blocking film 12b is formed on a region at least overlapping, on a plane view, the light blocking film 12a extended as a canopy in such a manner as to have the same width as that of the width h1 of the light blocking film 12a. This allows sufficiently blocking ambient light etc.

Here, films for blocking light such as the light blocking films 12a and 12b are generally referred to as a light blocking film 12.

Furthermore, on a portion of the protecting plate 9 which portion is near the wavelength selective reflection mirror 11, there is provided a low reflection sheet 19 serving as a light blocking member. The low reflection sheet 19 is a sheet which exhibits low reflectance with respect to light other than the light from a light source such as the light emitting diode 10 (e.g. ambient light).

Consequently, as shown in (d) of FIG. 3, ambient light is less likely to be reflected by the low reflection sheet 19, so that it is possible to reduce the amount of ambient light which is incident to the wavelength selective reflection mirror 11. Accordingly, it is possible to prevent light other than the light from the light emitting diode 10 (e.g. ambient light) from entering the light receiving surface 13a of the line sensor 13.

As with the light blocking films 12a and 12b, the low reflection sheet 19 is most preferably made of a material which is black in color, completely blocks light, and has concavities and convexities that absorb light on its surface. The low reflection sheet 19 may be a tape or black coating (printing) in shape, but not limited to them.

It is preferable that the low reflection sheet 19 is formed on a region at least overlapping, on a plane view, the light blocking film 12a extended as a canopy in such a manner as to have the same width as that of the width h1 of the light blocking film 12a. This allows sufficiently blocking ambient light etc.

Furthermore, near a light-incident portion of the wavelength selective reflection mirror 11, there are provided light blocking slits 30 serving as a light blocking material on a region which overlaps, on a plane view, the light blocking film 12a serving as a canopy. The light-incident portion is a portion at which signal light emitted from the light emitting diode 10 is incident to the wavelength selective reflection mirror 11.

Consequently, signal light which is incident with small angle is transmitted whereas ambient light which is incident with large angle for example is less likely to be transmitted due to the light blocking slits 30, so that it is possible to reduce the amount of ambient light incident to the wavelength selective reflection mirror 11. Accordingly, it is possible to prevent light other than the light from the light emitting diode 10 (e.g. ambient light) from entering the light receiving surface 13a of the line sensor 13.

As with the light blocking films 12a and 12b, the light blocking slits 30 are most preferably made of a material which is black in color, completely blocks light, and have concavities and convexities that absorb light on its surface. The light blocking slits 30 may be a tape or black coating (printing) in shape, but not limited to them.

As the gap between the light blocking slits 30 is narrower (as the number of slits per unit area is larger), it is possible to more narrowly limit a direction in which light is incident.

Figure 10:
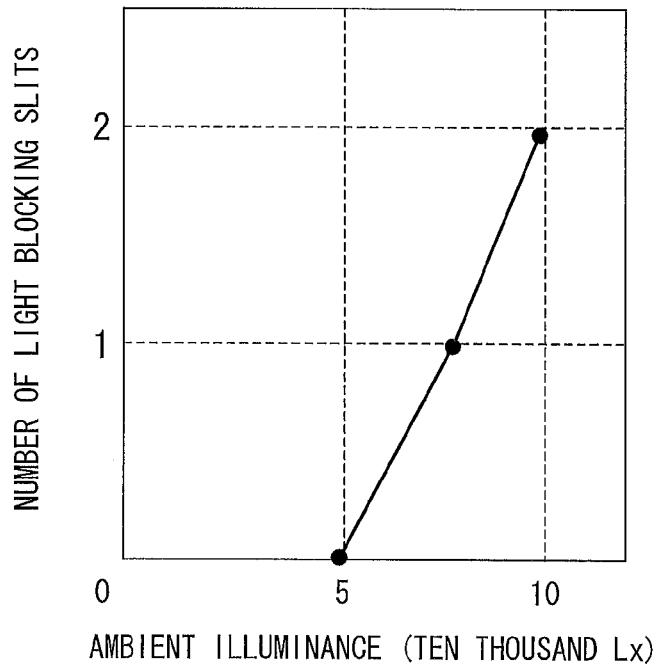
FIG. 10
Figure 11:
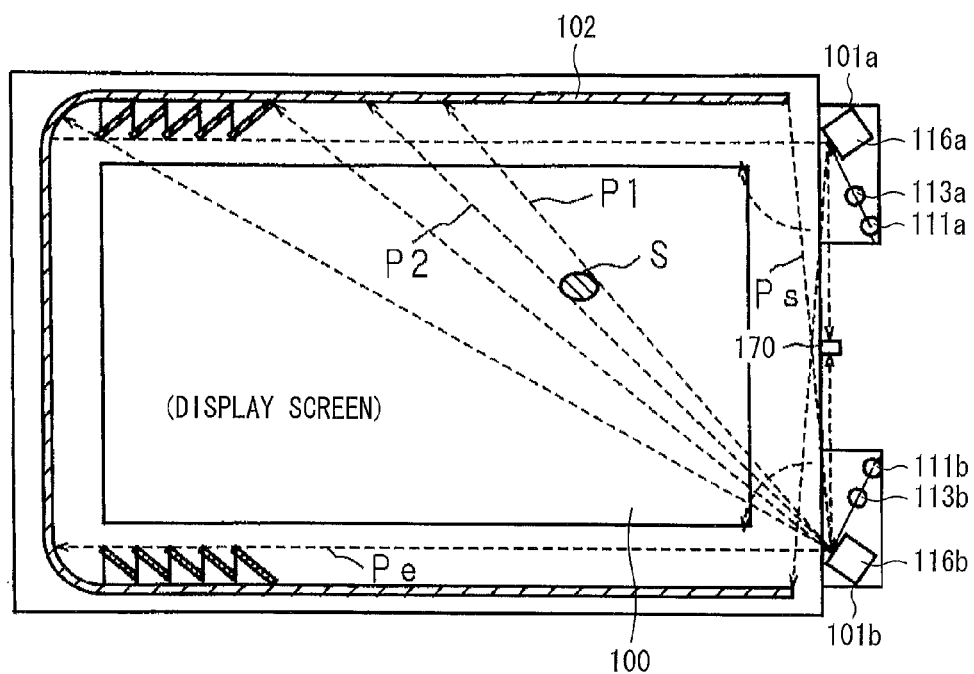
FIG. 11

FIG. 10 is a graph showing a relation between ambient illuminance and the number of slits of the light blocking slits 30 required for blocking light.

As shown in FIG. 10, the ambient illuminance is in linear relation to the number of the light blocking slits 30. For example, in a case where the ambient illuminance is 100,000 1×, the number of slits of the light blocking slits 30 required for blocking light is 2. This configuration allows sufficiently blocking ambient light etc.

Figure 4:
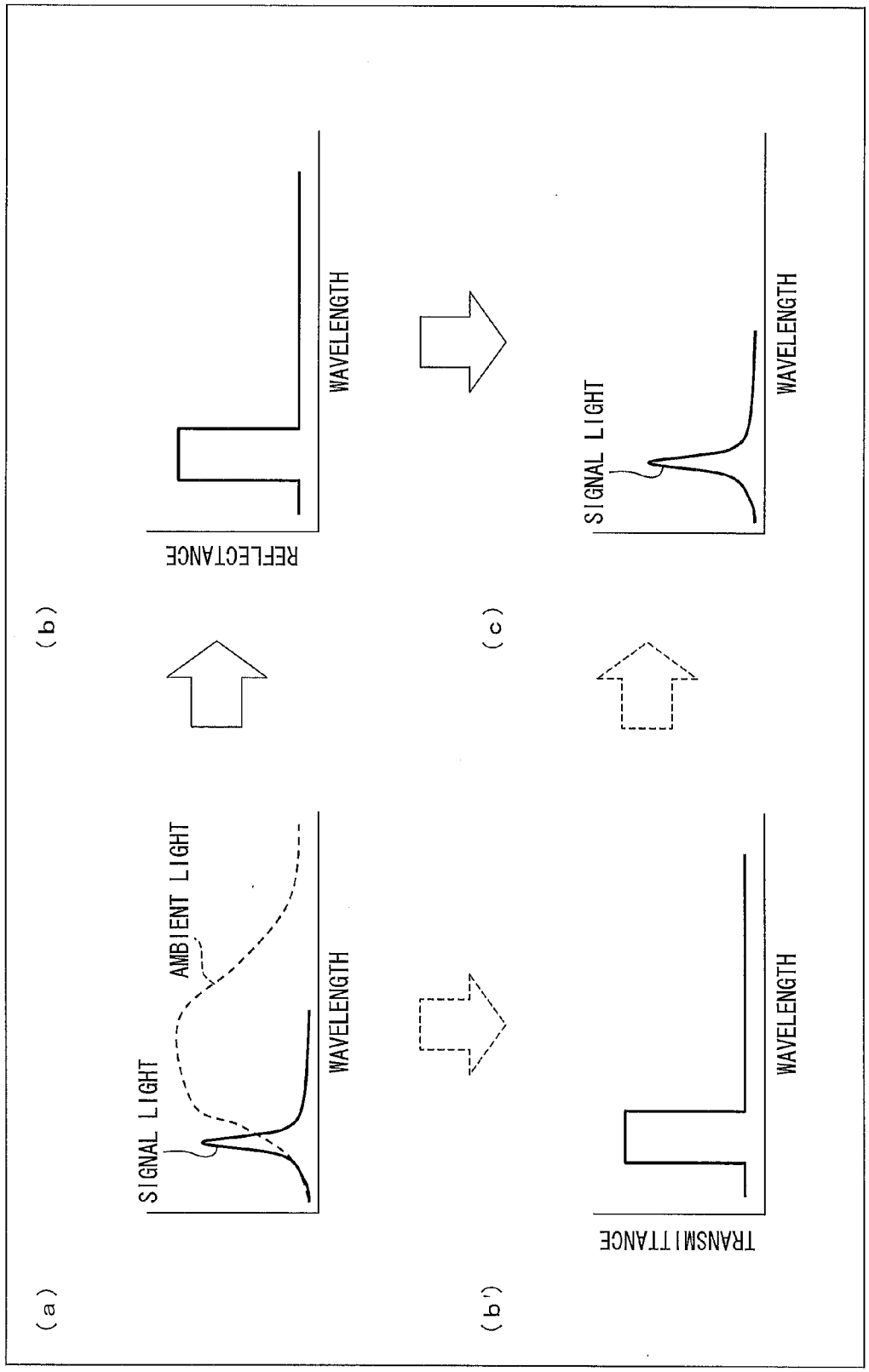
FIG. 4

With reference to FIG. 4, the following explains the wavelength selective reflection mirror 11 more specifically.

FIG. 4 shows waveform charts for explaining the effect yielded by the wavelength selective reflection mirror 11.

In (a) of FIG. 4, a full line indicates light from the light emitting diode 10, i.e. signal light, and a broken line indicates ambient light.

As shown in (a) of FIG. 4, in the environment where the liquid crystal display device 1 is used, signal light and ambient light coexist. The ambient light has a relatively broad wavelength band.

By providing the wavelength selective reflection mirror 11 having a function for selectively reflecting light with a specific wavelength out of incident light, it is possible to efficiently extract only the signal light as shown in (c) of FIG. 4. In this case, the wavelength band of the signal light corresponds to the wavelength band at which reflectance of the wavelength selective reflection mirror 11 is high as shown in (b) of FIG. 4.

In the present embodiment, the wavelength selective reflection mirror 11 is used. Alternatively, a transmission filter (wavelength selective transmission filter) may be used as a wavelength selecting section.

That is, by providing the wavelength selective transmission filter having a function for selectively transmitting light with a specific wavelength out of incident light, it is possible to sufficiently extract only the signal light as shown in (c) of FIG. 4. In this case, the wavelength band of the signal light corresponds to the wavelength band at which reflectance of the wavelength selective transmission filter is high as shown in (b') of FIG. 4.

Both the wavelength selective reflection mirror 11 and the wavelength selective transmission filter may be used as wavelength selecting sections.

As described above, in the present embodiment, the line sensor 13 serving as a coordinate sensor is provided with the wavelength selective reflection mirror 11, the light blocking film 12, the low reflection sheet 19, and the light blocking slits 30. Accordingly, it is possible to surely prevent light other than the light from the light emitting diode 10 (e.g. ambient light) from entering the light receiving surface 13a of the line sensor 13.

A principle to reduce the influence of ambient light is explained below more specifically.

As shown in (a) of FIG. 3, there are five possible paths A-F via which ambient light is incident to the light receiving surface 13a of the line sensor 13.

Light which is incident via the paths A and B with incident angles θA and θB, respectively, is blocked by the light blocking film 12b provided at a region where the air layer 17 exists, and does not enter the light receiving surface 13a of the line sensor 13.

Light which is incident via the path C with incident angle θc is blocked by the light blocking film 12a provided on the top surface of the wavelength selective reflection mirror 11, and does not enter the light receiving surface 13a of the line sensor 13.

Light which is incident via the path D is not reflected by the wavelength selective reflection mirror 11 except for light whose wavelength is equal to that of light from the light emitting diode 10, and does not enter the light receiving surface 13a of the line sensor 13.

Light which is incident via the path E is less likely to be reflected by the low reflection sheet 19 provided on the top surface of the protecting plate 9, and is not incident to the wavelength selective reflection mirror 11.

Light which is incident via the path F is blocked by the light blocking slits 30 provided near the light incident portion of the wavelength selective reflection mirror 11, and is not incident to the wavelength selective reflection mirror 11.

Consequently, all of the light incident via the paths A-F do not enter the light receiving surface 13a of the line sensor 13.

With the above configurations, the amount of ambient light entering the light receiving surface 13a of the line sensor 13 is reduced greatly, so that it is possible to exactly detect the position of a recognized object even when the ambient light is intense.

(Line Sensor)

With reference to FIG. 5, the following explains the configuration of the line sensor 13 in more detail.

FIG. 5 is a block diagram schematically showing the configuration of the line sensor 13.

As shown in FIG. 5, the line sensor 13 includes light receiving elements 13s aligned in a single direction (aligned one-dimensionally) and a line sensor detection circuit 16.

As shown in FIG. 2 mentioned above, the line sensors 13 is integrally formed on a peripheral portion of the active matrix substrate 2 in such a manner that the light receiving surface 13a faces upward.

The light receiving elements 13s are formed, by a publicly known semiconductor technique, simultaneously with circuits such as pixel TFTs, on the surface of the active matrix substrate 2 on which surface the circuits such as pixel TFTs are formed.

Each of the light receiving elements 13s is made of an optical sensor such as a photodiode and a phototransistor, and detects the amount of received light by extracting a current or charge corresponding to intensity of the received light to outside.

The light receiving elements 13s are not particularly limited as long as they can sense light from the light emitting diode 10 serving as a light source for detecting indicated coordinates. For example, the light receiving elements 13s may be optical sensors made of a-Si (amorphous silicon), p-Si (polysilicon, polycrystalline silicon), or CG silicon (Continuous Grain Silicon).

The line sensor detection circuit 16 includes a shift register 20, switching elements 21, a detection line 22, and an A/D (analog-digital) conversion circuit 23.

Upon input of a CLK (clock pulse) from outside, the shift register 20 generates scan signals for selecting the switching elements 21 in turn.

Each of the switching elements 21 serves as a switch for extracting, to the detection line 22, a current or charge corresponding to intensity of light received by a corresponding light receiving element 13s in accordance with the scan signal generated by the shift register 20.

The signal on the detection line 22 is converted by the A/D conversion circuit 23 into a digital signal and is outputted to a coordinate detection circuit (not shown). In accordance with the digital signal, the coordinate detection circuit detects the position of a recognized object.

(System Configuration of Liquid Crystal Display Device)

Figure 6:
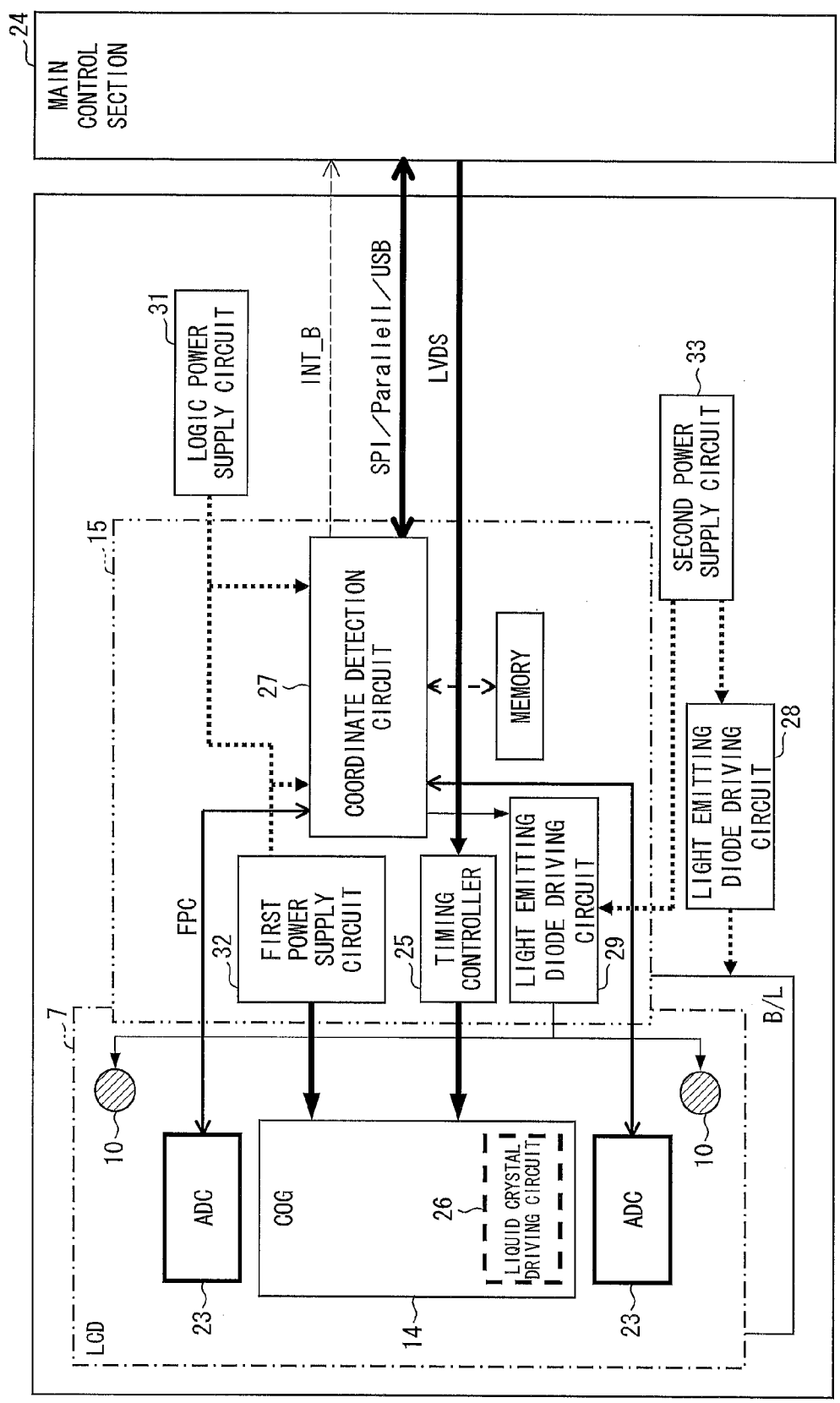
FIG. 6

With reference to FIG. 6, the following explains a system configuration of the liquid crystal display device 1.

FIG. 6 is a block diagram showing the system configuration of the liquid crystal display device 1.

As shown in FIG. 6, a main control section (host) 24 and a timing controller (T-CON) 25 are connected with each other by an LVDS (Low Voltage Differential Signaling) method, and the main control section 24 transmits a vertical sync signal, a horizontal sync signal, a data enable signal, an RGB data signal, a clock signal etc. to the timing controller 25.

The timing controller 25 transmits the RGB data signal to a source driving circuit (not shown) included in a liquid crystal driving circuit (display controller) 26, and controls a gate driving circuit (not shown) included in the liquid crystal driving circuit 26.

Furthermore, as described above, a current or charge corresponding to intensity of light received by the light receiving element 13s (not shown) included in the liquid crystal panel 7 is converted by the A/D conversion circuit (ADC) 23 into a digital signal, which is transmitted to a coordinate detection circuit (Recognition LSI) 27.

The liquid crystal display device 1 further includes a driving circuit (LED Driver) 29 for controlling the light emitting diode 10 serving as a light source for a coordinate sensor and a driving circuit (LED Driver) 28 for controlling a light emitting diode included in the backlight 8.

Furthermore, a logic power supply circuit 31 supplies a power of 1.8 V or 3.0 V to the coordinate detection circuit 27 and a first power supply circuit (Power Supply for Sensor and Display) 32.

The first power supply circuit 32 supplies a power to the liquid crystal driving circuit 26 and the line sensor 13.

Furthermore, a second power supply circuit (Power Supply) 33 supplies a power to the driving circuit 29 for controlling the light emitting diode 10 serving as a light source for a coordinate sensor and to the driving circuit 28 for controlling the light emitting diode included in the backlight 8.

Furthermore, the coordinate detection circuit 27 and the main control section 24 can be connected with each other by connection methods such as SPI (Serial Peripheral Interface), parallel, and USB (Universal Serial Bus). When coordinates are detected, an interrupting signal (INT_B) is transmitted from the coordinate detection circuit 27 to the main control section 24, and then coordinate data is transmitted from the coordinate detection circuit 27 to the main control section 24.

As described above, in the liquid crystal display device 1, a current or charge corresponding to intensity of light received by the light receiving element 13c is converted by the line sensor detection circuit 16 into a digital signal, which is transmitted to the coordinate detection circuit 27 so that coordinates of a recognized object are detected.

(Principle for Detecting Coordinates)

Figure 7:
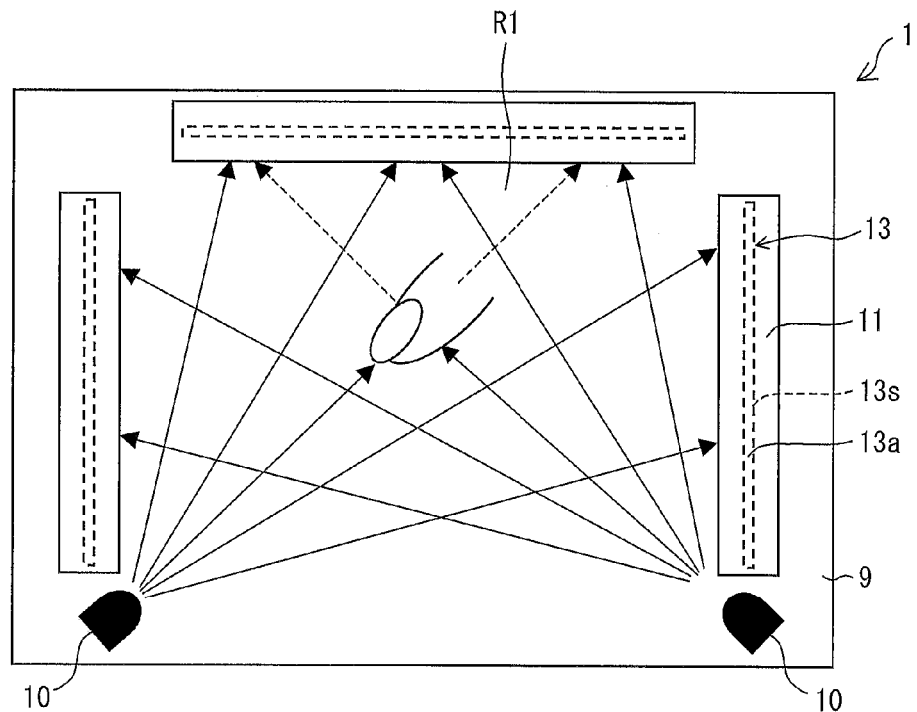
FIG. 7

With reference to FIG. 7, the following explains a principle for detecting coordinates by a coordinate sensor.

FIG. 7 is a plane view schematically showing a configuration of the main part of the liquid crystal display device 1 and the principle for detecting coordinates.

In the liquid crystal display device 1 shown in FIG. 7, the coordinate sensor includes the line sensors 13 outside upper, left, and right sides of the display region R1 and the wavelength selective reflection mirrors 11 positioned on the line sensors 13, respectively. The light emitting diodes 10 are provided, as light sources for the coordinate sensor (light source for detecting indicated coordinates), at both ends of the outside of the lower side of the display region R1 of the liquid crystal display device 1.

Initially, an explanation is made as to a case where the coordinate input region R1 of the liquid crystal panel 7 is not touched by a recognized object such as a finger.

When light is emitted from the light emitting diode 10 along the surface of the protecting plate 9 in such a manner as to cover the whole surface of the coordinate input region R1, the light is totally reflected by the wavelength selective reflection mirror 11 and enters the light receiving surface 13a of the line sensor 13 positioned to face the corresponding wavelength selective reflection mirror 11. Here, "positioned to face" indicates positioning of a line sensor in such a manner that, for example, light incident to one wavelength selective reflection mirror is reflected by the wavelength selective reflection mirror and then is incident to the light receiving surface.

The light receiving element 13s included in the line sensor 13 extracts a current or charge corresponding to intense light to outside.

On the other hand, when the coordinate input region R1 is touched by a recognized object such as a finger, light traveling in all directions in a plane parallel to the display region R1 of the liquid crystal display device 1 is blocked, so that the portion corresponding to light behind the recognized object seen from the light emitting diode 10 is shadowed (dotted lines in the drawing).

Consequently, weak light is incident to a part of the line sensor 13 behind the recognized object seen from the light emitting diode 10 (line sensor 13 at the upper side of the drawing).

Consequently, the light receiving element 13s provided in the part of the line sensor 13 which part is shadowed by the recognized object extracts a current or charge corresponding to the weak light. Accordingly, it is possible to detect the position touched by the recognized object such as a finger by triangulation.

A specific method for detecting coordinates of the recognized object S by triangulation will be explained later.

In the present embodiment, two light emitting diodes 10 emit light alternately. That is, while the light emitting diode 10 at the right side of the drawing emits light, the line sensors 13 at the upper and left sides of the drawing receive light. On the other hand, while the light emitting diode 10 at the left side of the drawing emits light, the line sensors 13 at the upper and right sides of the drawing receive light. This configuration allows reducing power consumption.

(Triangulation)

Figure 8:
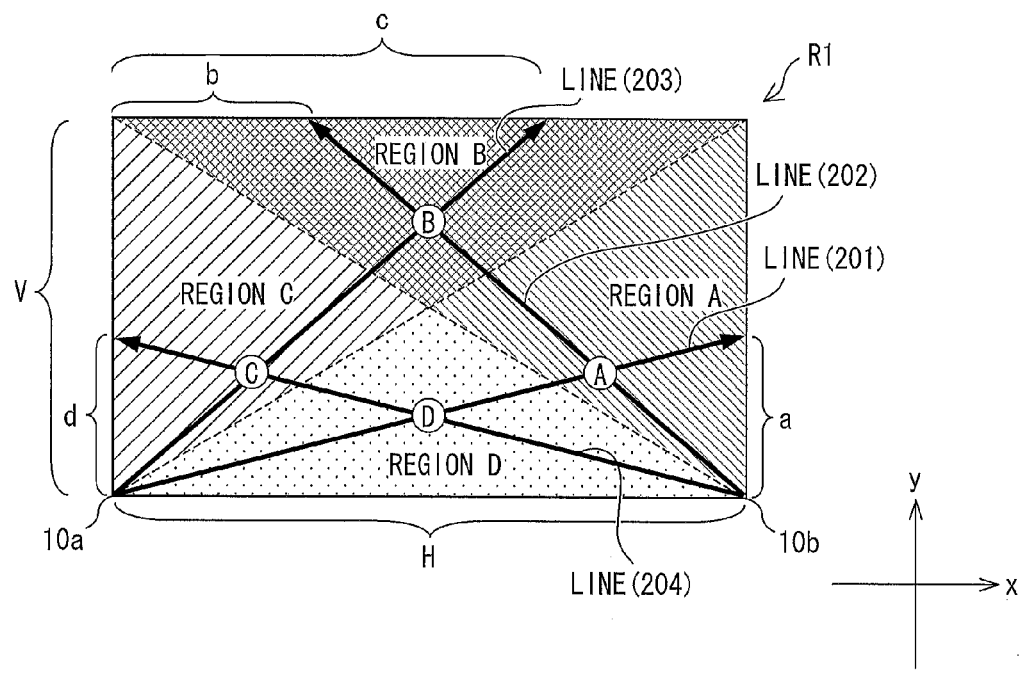
FIG. 8

FIG. 8 is a view for explaining how to calculate the position touched by a recognized object such as a finger by triangulation.

As shown in FIG. 8, a method for calculating coordinates (x, y) of the recognized object is classified into four cases depending on which part of the coordinate input region R1 is to be touched.

Hereinafter, for convenience of explanation, the light emitting diode 10 at the left end of the lower side in the drawing (hereinafter "lower side") is referred to as a light source 10a, and the light emitting diode at the right end of the lower side is referred to as a light source 10b.

Furthermore, assume that the coordinate input region R1 is divided by diagonals into four regions, and a triangle whose bottom is the right side in the drawing (hereinafter "right side") and whose apex is the center point of the coordinate input region R1 indicated as the interaction of the diagonals (hereinafter "center point") is referred to as a region A. Subsequently, in a counterclockwise manner, triangles whose bottoms are the upper side of the coordinate input region R1 in the drawing (hereinafter "upper side"), the left side (hereinafter "left side"), and the lower side, respectively, and whose apexes are the center of the coordinate input region R1 are referred to as regions B, C, and D, respectively.

Furthermore, the lengths of the upper side and the lower side of the coordinate input region R1 are referred to as "H" and the lengths of the right side and the left side are referred to as "V".

Initially, when a point in the region A (hereinafter "point A" (indicated by the circled letter A in FIG. 8. The same is applied to points B-D)) is touched, a portion behind (backside of) the point A is shadowed seen from the light source 10a. Consequently, a shadow to the light from the light source 10a appears on the right side. Similarly, a shadow to the light from the light source 10b appears on the upper side.

Here, assume that a distance between the light source 10b (i.e. right end corner of the lower side) and a position at which a line (201) passing through the light source 10a and the point A intersects the right side (i.e. a position of a shadow casted on the right side) is referred to as "a". At that time, the line (201) passing through the light source 10a and the point A can be expressed equation (1) below using coordinates (x, y).

$$y = a \times x / H \quad (1)$$

Here, in a case where the coordinate input region R1 is a rectangle, the coordinates (x, y) are such that a long side of the rectangle is equal to x-coordinate and a short side of the rectangle is equal to y-coordinate.

On the other hand, assume that a distance between the corner positioned diagonally to the light source 10b and a position at which a line (202) passing through the light source 10b and the point A intersects the upper side (i.e. a position of shadow casted on the upper side) is referred to as "b". At that time, the line (202) passing through the light source 10b and the point A can be expressed by equation (2) below using coordinates (x, y).

$$y = V(H-x)/(H-b) \quad (2)$$

Accordingly, equation (3) below is derived from the equations (1) and (2).

$$a \times x/H = V(H-x)/(H-b) \quad (3)$$

Accordingly, the coordinates (x, y) of the point A can be calculated by equations (4) and (5) below based on the equation (3).

$$x = H^2 \times V/(a \times H - a \times b + H \times V) \quad (4)$$

$$y = y = a \times H \times V/(a \times H - a \times b + H \times V) \quad (b\,5)$$

Next, when a point in the region B (hereinafter "point B") is touched, both of shadows to the light sources 10a and 10b appear on the upper side. For convenience, an explanation is made below as to a case where the point B is positioned on the line (202) passing through the light source 10b and the point A. When the point B is positioned otherwise, it is possible to calculate the coordinates of the point B similarly with below by changing variables b and c below depending on where the point B is positioned.

Here, assume that a distance between the left end corner of the upper side and a position at which a line (203) passing through the light source 10a and the point B intersects the upper side (i.e. a position of a shadow casted on the upper side) is referred to as "c". At that time, the line (203) passing through the light source 10a and the point B can be expressed by equation (6) below using coordinates (x, y).

$$y = V \times x/c \quad (6)$$

On the other hand, when the distance between the left end corner of the upper side and the position at which the line (202) passing through the light source 10b and the point B (i.e. a position of a shadow casted on the upper side) is referred to as "b", the line (202) passing through the light source 10b and the point B can be expressed by the equation (2) using coordinates (x, y) as described above.

Accordingly, equation (7) below is derived from the equations (2) and (6).

$$V \times x/c = V(H-x)/(H-b) \quad (7)$$

Accordingly, coordinates (x, y) of the point B can be calculated by equations (8) and (9) below based on the equation (7).

$$x = c \times H/(H-b+c) \quad (8)$$

$$y = H \times V/(H-b+c) \quad (9)$$

Furthermore, when a point in the region C (hereinafter "point C") is touched, a shadow to the light source 10a appears on the upper side and a shadow to the light source 10b appears on the left side. For convenience, an explanation is made below as to a case where the point C is positioned on the line (203) passing through the light source 10a and the point B. When the point C is positioned otherwise, it is possible to calculate the coordinates of the point C similarly with below by changing variables c and d below depending on where the point C is positioned.

When the distance between the left end corner of the upper side and the position at which the line (203) passing through the light source 10a and the point C intersects the upper side (i.e. the position of a shadow casted on the upper side) is referred to as "c", the line (203) passing through the light source 10a and the point C can be expressed by the equation (6) using coordinates (x, y) as described above.

On the other hand, when a distance between the light source 10a (i.e. left end corner of the lower side) and a position at which a line (204) passing through the light source 10b and the point C intersects the left side (i.e. a position of a shadow casted on the left side) is referred to as "d", the line (204) passing through the light source 10b and the point C can be expressed equation (10) below using coordinates (x, y).

$$y = d - d \times H \times x \quad (10)$$

Accordingly, equation (11) below is derived from the equations (6) and (10).

$$V \times x/c = d - d \times H \times x \quad (11)$$

Accordingly, coordinates (x, y) of the point C can be calculated from equations (12) and (13) below based on the equation (11).

$$x = c \times d \times H/(c \times d + H \times V) \quad (12)$$

$$y = d \times H \times V/(c \times d + H \times V) \quad (13)$$

Furthermore, when a point in the region D (hereinafter "point D") is touched, a shadow to the light source 10a appears on the right side and a shadow to the light source 10b appears on the left side. For convenience, an explanation is made below as to a case where the point D is positioned on an intersection of the line (201) passing through the light source 10a and the point A and the line (204) passing through the light source 10b and the point C. When the point D is positioned otherwise, it is possible to calculate the coordinates of the point D similarly with below by changing variables a and d below depending on where the point D is positioned.

Since the point D is positioned on the line (201) passing through the light source 10a and the point A and on the line (204) passing through the light source 10b and the point C, the line (201) passing through the light source 10a and the point D and the line (204) passing through the light source 10b and the point D can be expressed by the equations (1) and (10).

That is, when the distance between the light source 10b and the position at which the line passing through the light source 10a and the point D intersects the right side (i.e. position of a shadow casted on the right side) is referred to as "a", the line passing through the light source 10a and the point D is expressed by the equation (1) using coordinates (x, y). Furthermore, when the distance between the light source 10a and the position at which the line passing through the light source 10b and the point D intersects the left side (i.e. position of a shadow casted on the left side) is referred to as "d", the line (204) passing through the light source 10b and the point D is expressed by the equation (10) using coordinates (x, y).

Accordingly, equation (14) below is derived from the equations (1) and (10).

$$a \times x/H = d - d \times H \times x \quad (14)$$

Accordingly, coordinates (x, y) of the point D can be calculated from equations (15) and (16) below based on the equation (14).

$$x = d \times H/(a+d) \quad (15)$$

$$y = a \times d/(a+d) \quad (16)$$

As described above, the present embodiment allows detecting indicated coordinates of a recognized object by triangulation using the fact that the level of a detection signal (amount of detection of received light) from a shadowed line sensor 13 is lower than the level of a detection signal from an unshadowed line sensor 13.

The present invention is not limited to the description of the embodiments above, but may be altered by a skilled person within the scope of the claims. An embodiment based on a proper combination of technical means disclosed in different embodiments is encompassed in the technical scope of the present invention.

Furthermore, the coordinate sensor of the present invention is arranged such that said at least one wavelength selecting section is a wavelength selective reflection mirror.

Furthermore, the coordinate sensor of the present invention is arranged such that said at least one wavelength selecting section is a wavelength selective transmission filter.

With the arrangement, the wavelength selecting section can be easily made of a band path mirror, a band path filter etc. for example.

Furthermore, the coordinate sensor of the present invention is arranged such that the wavelength selective reflection mirror is provided on each of a plurality of light path changing sections for changing a light path of light having passed through the image display region, each of said at least two line sensors is provided outside the image display region, and has a light receiving surface parallel to an image display surface of the image display body, each of the plurality of light path changing sections guides the light having passed through the image display region to a corresponding one of said at least two line sensors, and the wavelength selective reflection mirror is covered with a canopy extended in a direction parallel to the image display surface.

Furthermore, the coordinate sensor of the present invention is arranged such that a length of the canopy extended in a direction parallel to the image display surface is not less than two times and not more than six times larger than a length of the wavelength selective reflection mirror in a direction vertical to the image display surface.

With the arrangement, the wavelength selective reflection mirror is coated with a canopy, and the length of the canopy is not less than two times larger than the length of the wavelength selective reflection mirror in a direction vertical to the image display surface (apparent height of the wavelength selective reflection mirror).

Consequently, ambient light is less likely to be incident to the wavelength selective reflection mirror. Accordingly, even when the ambient light includes a large amount of diffusing light components, the ambient light is less likely to be incident to the line sensor.

Accordingly, it is possible to detect the position of a recognized object less dependently of a change in the ambient light.

Furthermore, with the arrangement, the length of the canopy is not more than six times larger than the apparent height of the wavelength selective reflection mirror, so that image display is less likely to suffer an adverse influence.

Furthermore, the coordinate sensor of the present invention is arranged such that the image display surface is provided with a light blocking member at a region overlapping the canopy on a plane view.

With the arrangement, for example, it is easy to prevent light forming a small angle with respect to the image display surface in particular from being incident to the wavelength selective reflection mirror.

Furthermore, the coordinate sensor of the present invention is arranged such that there is provided an air layer between the image display surface and the light receiving surface of each of said at least two line sensors, and there is provided a light blocking member at a region which overlaps the canopy on a plane view and which is adjacent to the air layer.

With the arrangement, there is provided a light blocking member at a region which overlaps the canopy on a plane view.

Accordingly, it is possible to more surely prevent ambient light from being incident to the line sensor.

Furthermore, since the light blocking member is provided at a region adjacent to the air layer, provision of the light blocking member does not increase the thickness of the coordinate sensor.

The coordinate sensor of the present invention is arranged such that the wavelength selective reflection mirror is provided with light blocking slits at a region which is near a light-incident portion where the light emitted from the light emitting element is incident and which overlaps the canopy on a plane view.

With the arrangement, it is easy to prevent ambient light from being incident to the wavelength selective reflection mirror.

The coordinate sensor of the present invention is arranged such that the plurality of light path changing sections and said at least two line sensors are provided along three sides of the image display body, and a plurality of light emitting elements included in said at least one light emitting element are provided at both ends of remaining one side.

With the arrangement, the position touched by a recognized object such as a finger can be computed by triangulation.

Furthermore, the coordinate sensor of the present invention is arranged such that said at least one light emitting element emits light whose wavelength band is out of a visible region.

With the arrangement, the light emitting element emits light whose wavelength band is out of a visible region, so that it is possible to select and separate ambient light.

A display device of the present invention includes the aforementioned coordinate sensor.

Furthermore, the display device of the present invention is arranged so as to further include a counter substrate and an active matrix substrate, said at least two line sensors being provided on a surface of the active matrix substrate on which surface active elements are provided.

With the arrangement, the line sensors are provided on a surface of the active matrix substrate on which surface active elements are provided. Since the line sensors can be formed in the step of forming the active elements, the line sensors can be formed easily.

INDUSTRIAL APPLICABILITY

The present invention is preferably applicable to a display device having a coordinate sensor function.

REFERENCE SIGNS LIST

1. Liquid crystal display device
2. Active matrix substrate
3. Counter substrate
4. Liquid crystal layer
5. Upper side polarization plate
6. Lower side polarization plate
7. Liquid crystal panel
8. Backlight
9. Protecting plate
10. Light emitting diode (light emitting element)
10a. Light source
10b. Light source
11. Wavelength selective reflection mirror (wavelength selecting section)
12. Light blocking film
13. Line sensor
13a. Light receiving surface
13s. Light receiving element
14. Chip 15. FPC
16. Line sensor detection circuit
17. Air layer
18. Sealing material
19. Low reflection sheet
20. Shift register
21. Switching element
22. Detection line
23. A/D conversion circuit
30. Light blocking slits

The invention claimed is:

1. A coordinate sensor, comprising:
at least one light emitting element; and
at least two line sensors each including a plurality of light receiving elements, said at least two line sensors being positioned along an x-axis direction and a y-axis direction, respectively,
light emitted from said at least one light emitting element passing through an image display region of an image display body and being received by at least one of the plurality of light receiving elements, so that indicated coordinates of a detection target are detected based on a change in an amount of light received by said at least one of the plurality of light receiving elements,
the coordinate sensor further comprising, between said at least one light emitting element and the plurality of light receiving elements, at least one wavelength selecting section for allowing the light emitted from said at least one light emitting element to be selectively incident to said at least one of the plurality of light receiving elements,
said at least one wavelength selecting section having at least one function of selectively reflecting, selectively transmitting, and selectively reflecting and transmitting the light emitted from said at least one light emitting element, wherein
said at least one wavelength selecting section is a wavelength selective reflection mirror,
the wavelength selective reflection mirror is provided on each of a plurality of light path changing sections for changing a light path of light having passed through the image display region,
each of said at least two line sensors is provided outside the image display region, and has a light receiving surface parallel to an image display surface of the image display body,
each of the plurality of light path changing sections guides the light having passed through the image display region to a corresponding one of said at least two line sensors, and
the wavelength selective reflection mirror is covered with a canopy extended in a direction parallel to the image display surface.

2. The coordinate sensor as set forth in claim 1, wherein a length of the canopy extended in a direction parallel to the image display surface is not less than two times and not more than six times larger than a length of the wavelength selective reflection mirror in a direction vertical to the image display surface.

3. The coordinate sensor as set forth in claim 1, wherein the image display surface is provided with a light blocking member at a region overlapping the canopy on a plane view.

4. The coordinate sensor as set forth in claim 1, wherein
there is provided an air layer between the image display surface and the light receiving surface of each of said at least two line sensors, and
there is provided a light blocking member at a region which overlaps the canopy on a plane view and which is adjacent to the air layer.

5. The coordinate sensor as set forth in claim 1, wherein the wavelength selective reflection mirror is provided with light blocking slits at a region which is near a light-incident portion where the light emitted from the light emitting element is incident and which overlaps the canopy on a plane view.

6. The coordinate sensor as set forth in claim 1, wherein the plurality of light path changing sections and said at least two line sensors are provided along three sides of the image display body, and a plurality of light emitting elements included in said at least one light emitting element are provided at both ends of remaining one side.

7. The coordinate sensor as set forth in claim 1, wherein said at least one light emitting element emits light whose wavelength band is out of a visible region.

8. A display device, comprising a coordinate sensor as set forth in claim 1.

9. The display device as set forth in claim 8, further comprising a counter substrate and an active matrix substrate,
said at least two line sensors being provided on a surface of the active matrix substrate on which surface active elements are provided.

* * * * *